US009945323B1

(12) United States Patent
Henck

(10) Patent No.: US 9,945,323 B1
(45) Date of Patent: Apr. 17, 2018

(54) LINEAR ACTUATOR

(71) Applicant: TK Holdings Inc., Armada, MI (US)

(72) Inventor: Jeremy M. Henck, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 239 days.

(21) Appl. No.: 13/958,489

(22) Filed: Aug. 2, 2013

Related U.S. Application Data

(60) Provisional application No. 61/679,005, filed on Aug. 2, 2012.

(51) Int. Cl.
| | |
|---|---|
| *F02G 3/00* | (2006.01) |
| *F16J 9/08* | (2006.01) |
| *F16J 9/28* | (2006.01) |
| *F16J 9/00* | (2006.01) |

(52) U.S. Cl.
CPC .................. *F02G 3/00* (2013.01); *F16J 9/00* (2013.01); *F16J 9/08* (2013.01); *F16J 9/28* (2013.01)

(58) Field of Classification Search
CPC .................. B25B 27/0085; B25C 1/04; B25C 1/041–1/047; B25C 1/08; B25C 1/186; B60R 21/26; B60R 21/268; B60R 21/274; B60R 22/4628; B60T 7/12; C06D 5/00; C06D 5/02; F02F 3/0015; F15B 1/24; F15B 15/1457; F15B 15/1466; F15B 15/19; F16J 15/006; F16J 15/008; F16J 15/164; F16J 15/166; F16J 15/3208; F16J 15/3216; F16J 15/3236; F16J 15/3448; F16J 15/36; F16J 15/38; F16K 1/2268; F16K 3/0227; F16K 3/188; F16K 5/0478; F16K 5/0673; F16K 5/188; F16K 41/00; F16K 41/02; F16K 41/04; F16K 41/046; F24B 3/006; F24B 3/04; H01R 43/0275
USPC .......... 60/632–638, 520; 16/66; 92/26, 109, 92/110, 146, 165 PR; 102/530, 531; 180/271; 251/175, 214; 277/387, 277/434–437, 558; 280/736, 737, 741; 417/222, 269
See application file for complete search history.

(56) References Cited

U.S. PATENT DOCUMENTS

| | | | | |
|---|---|---|---|---|
| 3,393,605 A * | 7/1968 | Parnell | ........................... | 89/1.14 |
| 3,489,130 A * | 1/1970 | Polidan et al. | ............ | 123/193.4 |
| 3,508,531 A * | 4/1970 | Squinto et al. | ............ | 123/193.6 |
| 4,237,690 A * | 12/1980 | Tsuge | ...................... | F15B 15/19 60/632 |
| 6,065,438 A * | 5/2000 | Kiesel | ........................ | F16J 9/20 123/193.6 |
| 6,102,363 A * | 8/2000 | Eberwein | .................. | F16K 3/26 251/31 |
| 6,688,211 B1 * | 2/2004 | Viet | .................................. | 92/51 |
| 7,739,993 B2 * | 6/2010 | Salzgeber | ............... | F02B 77/04 123/193.2 |

(Continued)

OTHER PUBLICATIONS

Piston Rings for Combustion Engines, Jan. 2010.*

*Primary Examiner* — Hoang Nguyen
(74) *Attorney, Agent, or Firm* — Meunier Carlin & Curfman LLC

(57) ABSTRACT

A linear actuator includes a housing and a piston slidably mounted within the housing. The piston has a first portion forming a sliding fit between the piston and the housing, a second portion spaced apart from both the housing and the first portion, and a groove formed between the first and second portions.

11 Claims, 3 Drawing Sheets

DETAIL A

(56) References Cited

U.S. PATENT DOCUMENTS

| | | | |
|---|---|---|---|
| 2002/0014076 A1* | 2/2002 | Blackburn et al. | 60/508 |
| 2004/0178381 A1* | 9/2004 | Sundararajan | F16K 3/0227 |
| | | | 251/175 |
| 2010/0307152 A1* | 12/2010 | Mayer et al. | 60/632 |
| 2012/0211942 A1* | 8/2012 | Smith et al. | 277/300 |

* cited by examiner

Pre-Actuated

Actuated

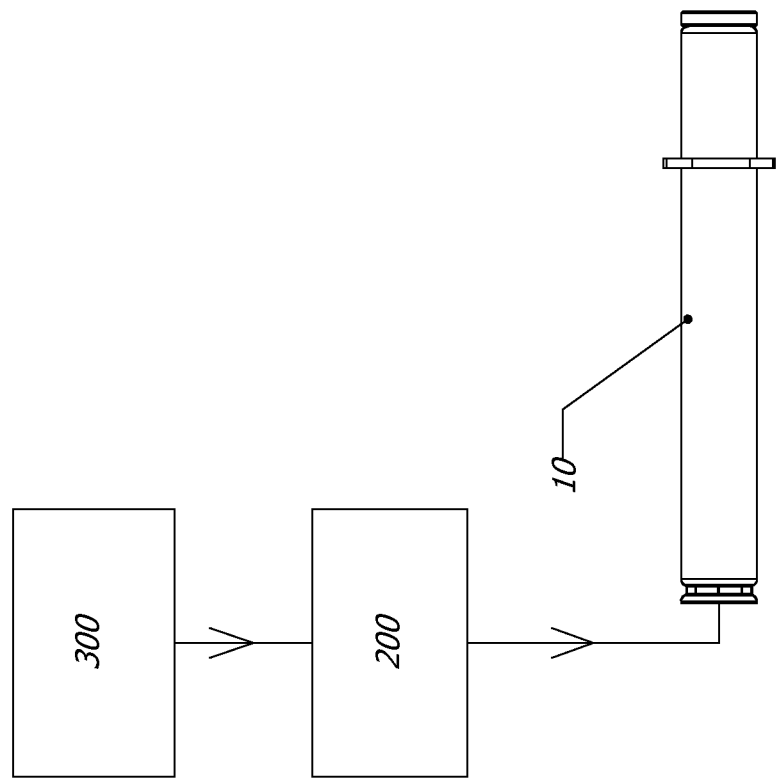

LINEAR ACTUATOR

CROSS-REFERENCE TO RELATED APPLICATIONS

This application claims the benefit of U.S. Provisional Application Ser. No. 61/679,005, filed on Aug. 2, 2012, the disclosure of which is incorporated herein by reference in its entirety.

BACKGROUND OF THE INVENTION

The present invention relates to linear actuators and to vehicle occupant protection systems or other safety systems employing linear actuators to elevate a vehicle surface such as a hood, in the event of collision or impact with a pedestrian.

Exemplary linear actuators typically employ pyrotechnic means to activate a piston within an actuator. U.S. Pat. No. 6,568,184 exemplifies known pyrotechnic actuators and is herein incorporated by reference in its entirety. The pyrotechnic means typically include an initiator or igniter, and a gas generating composition ignitable by the igniter once the actuator is activated. The use of a gas generating composition in addition to the igniter increases the cost of manufacture given that the gas generating composition must also be manufactured prior to insertion within the actuator. It has been found that because of a "blow-by" or sealing concern between the pyrotechnic means and a first end of an associated piston, it has been necessary to include the gas generating composition to increase the compressive pressure on the igniter side of the piston to ensure piston movement when the actuator is operative. Further, shipping and handling may be more complex or complicated due to transportation and related regulatory requirements related to the shipping of the gas generating composition. It would be an improvement to provide an alternative to the typical pyrotechnically actuated pistons.

SUMMARY OF THE INVENTION

In one aspect of the embodiments described herein, a linear actuator includes a housing and a piston slidably mounted within the housing. The piston has a first portion forming a sliding fit between the piston and the housing, a second portion spaced apart from both the housing and the first portion, and a groove formed between the first and second portions.

In another aspect of the embodiments described herein, a method of forming a seal in a gas-actuated linear actuator is provided. The method includes steps of: providing a housing; providing a piston slidably mounted within the housing, the piston having a first portion with a first diameter dimensioned to form a sliding fit between the piston and the housing, and a second portion having a second diameter less than the first diameter; providing a groove formed between the first and second piston portions, the groove having a third diameter dimensioned such that a resiliently deformable sealing means positioned within the groove is compressed by a predetermined amount between the housing and a floor of the groove when the groove is inserted into the housing, thereby providing a first contact normal force component between the sealing means and the housing; positioning a resiliently deformable sealing means within the groove; inserting the piston into the housing to compress the sealing means so as to provide the first contact normal force component; and introducing a pressurized gas into the groove through a gap between the piston second portion and the housing, such that the gas flows between a floor of the groove and the sealing means, thereby further compressing the sealing means in a direction toward the housing and providing a second contact normal force component between the sealing means and the housing acting in addition to the first component.

BRIEF DESCRIPTION OF THE DRAWINGS

The accompanying drawings, which are incorporated in and constitute a part of this specification, illustrate embodiments of the invention and together with the description serve to explain principles of the invention.

FIG. 1A is a magnified view of a portion of the embodiment shown in FIG. 1.

FIG. 1B is a cross-sectional view of a portion of a sealing means shown in a non-compressed condition and in a compressed condition.

FIG. 4 is a portion of a pedestrian protection system incorporating an embodiment of a linear actuator described herein.

DETAILED DESCRIPTION

Figure 1:
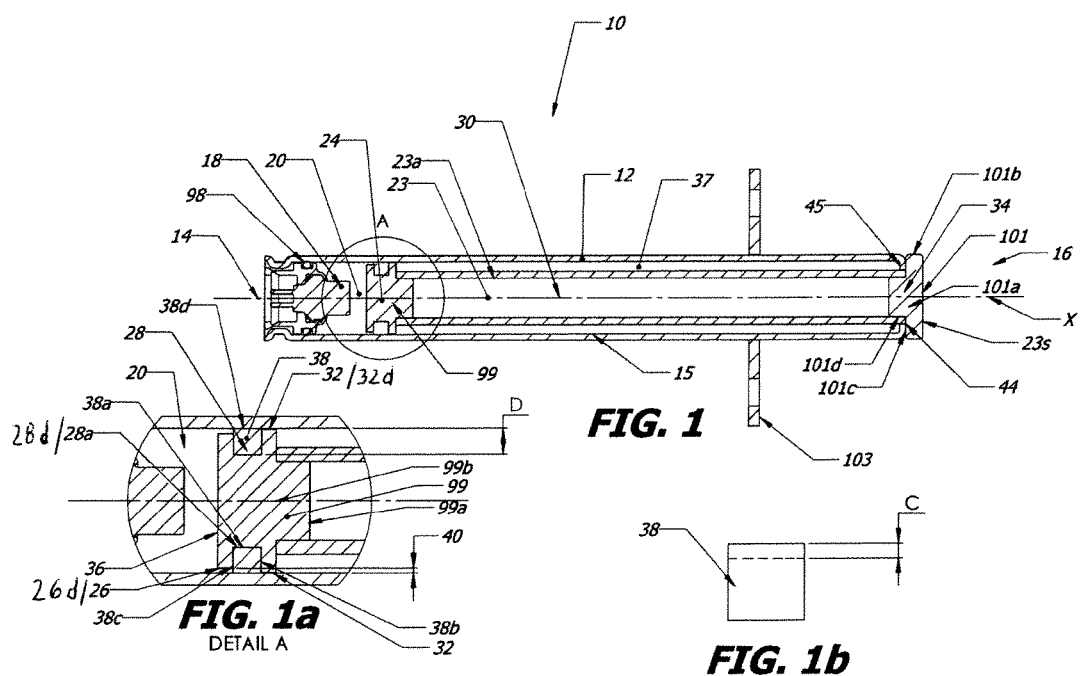
FIG. 1 is a cross-sectional side view of one embodiment of a linear actuator.

Like reference numerals refer to like parts throughout the description of several views of the drawings.

As shown in FIG. 1, a linear actuator 10 contains a housing 12. In the embodiment shown in FIG. 1, the housing 12 is cylindrical and contains a first end 14, a second end 16 opposite the first end, and a wall 15 defining a hollow body extending along a central axis X between the first and second ends. Housing 12 may be formed from a metallic material, a polymer, or any other suitable material.

An actuatable source 18 of pressurized fluid is operatively coupled to (or positioned within) housing first end 14. In the particular embodiment shown in the drawings, the pressurized fluid source 18 is a known initiator or igniter assembly. In a particular embodiment, the pressurized fluid source 18 is a known micro gas generator.

Fluid source 18 may be secured in (or to) housing 12 using any suitable method, such as crimping, adhesive attachment, for example. In the embodiment shown in the attached drawings, a portion of the housing 12 is crimped onto the initiator assembly to retain the initiator assembly in the housing, as so as to form a gas-tight seal between the housing wall and a resilient seal or O-ring 98 positioned in a groove formed on the initiator assembly 18, in a manner known in the art.

A piston rod assembly 23 (described below) is mounted within housing 12 such that an end surface 36 of the piston closest to the initiator assembly is spaced apart from the initiator so as to form a compression chamber 20 adjacent the initiator assembly 18. Chamber 20 may contain residual gases (for example, air at ambient pressure and temperature) prior to activation of the actuator.

Piston rod assembly 23 has a first end 24 incorporating a piston, a second, actuator end 34, and a piston rod 30 extending between the first and second ends. In the embodiment shown, piston rod 30 is contained within the housing 12 prior to actuator deployment and extends from immediately adjacent the chamber 20 to the housing second end 16. Rod 30 of the piston rod assembly 23 may be almost coextensive with the length of the housing 12. Piston rod 30 is also dimensioned with respect to housing 12 so as to define a plenum 37 between the piston rod 30 and the housing wall 15.

The actuator embodiments described herein incorporate a sealing means, generally designated 38, mounted on piston end 24 or operatively coupled to the piston end so as to provide a seal between the piston end 24 and the housing wall 15 during application of pressurized gases to the piston end to move the piston rod, thereby moving a load applied at the end of the piston rod. The seal is designed to minimize or prevent a flow of gases (known in the art as "blow-by") between the seal and the housing wall 15 in contact with the seal. Also, due to the contact normal forces between the sealing means and the housing wall 15, the seal affects the amount of force needed to move the piston rod assembly 23 along the housing (due to the need to overcome frictional forces between the sealing means and the housing wall), both during extension of the piston from the housing and during movement of the piston rod assembly back into the housing after extension.

It has been found that, when pressurized gases are applied to the piston end 24 of a piston rod assembly structured as described herein, the effectiveness of the sealing means in preventing blow-by is increased. It has been found that the contact normal force between the sealing means 38 and the housing wall 15 may be increased in proportion to the pressure of the pressurized gases applied to the piston end, thereby automatically increasing the effectiveness of the seal in response to any increased possibility of blow-by due to increased gas pressure.

In the embodiment described herein, the piston end 24 of the piston rod assembly 23 defines a piston including a first, relatively larger diameter portion 32 and a second, relatively smaller diameter portion 26 positioned spaced apart from the larger diameter portion in a direction toward initiator assembly 18. Although the housing and elements of the piston as described herein are shaped to have round or circular cross-sections, these elements may alternatively be shaped so as to have cross-sections with rectangular or other shapes, depending on the requirements of a particular application.

Opposed faces of the smaller diameter portion 26 and larger diameter portion 32 define an annular groove 28 is positioned between the smaller diameter portion 26 and the larger diameter portion 32. Groove is structured to receive a resilient sealing means 38 (described below) therein. In the embodiment shown, groove 28 has a rectangular cross section. However, the groove 28 may have any of a variety of other cross-sectional shapes.

Smaller diameter portion 26, having a first diameter 26d, is dimensioned so as to provide a space or gap 40 between the smaller diameter portion 26 and the housing wall 15. This gap permits pressurized gases resulting from activation of initiator assembly 18 to flow from chamber 20 into groove 28. It has been found that pressurized gases entering the groove containing a rectangular O-ring as described herein will flow between a floor 28a of the groove 28 and a surface 38a of the sealing means 38 opposite the groove floor, thereby forcing the seal radially outwardly against the housing wall 15 and increasing the contact normal force between the sealing means 38 and the housing wall 15, in a manner described in greater detail below. As used herein, the term "normal force" is defined as a force component acting perpendicular to the surface of contact between the housing wall 15 and the sealing means 38.

Larger diameter portion 32, having a second diameter 32d, is dimensioned in relation to the inner diameter of housing wall 15 such that a close sliding fit is formed between the piston first end and the housing wall. The fit between the larger diameter portion 32 and the housing wall is structured to minimize the flow of pressurized gases between the larger diameter portion 32 and the housing wall 15 during operation of the actuator.

In one particular embodiment, as shown in the drawings, the piston rod 30 is formed from a hollow tube having a wall 23a. The features at the piston first end 24 as described above may be machined, molded or otherwise suitably formed in the end of the piston rod. Alternatively, and as shown in the attached drawings, the piston first end features may be incorporated into a separate part or first endcap 99 attachable to a first end of the piston rod 30 using, for example, an interference fit, adhesive attachment, a weld, a crimp, or any other suitable method. In the embodiment shown, endcap 99 includes a body portion 99b and a projection 99a extending from the body portion into a first end of the hollow piston body, for use in securing the first endcap to the piston body in a manner previously described.

Piston rod 30 may be formed from a metallic material, a polymer, or any other suitable material or materials.

Also, in the embodiment shown, a second endcap 101 is attached to piston rod 30 at piston rod assembly second end 16. Second endcap 101 has a body portion 101a and a first, relatively larger diameter portion 101b extending from the body portion to define a first annular peripheral shoulder 101c extending around the body 101a. In the embodiment shown, larger diameter portion 101b is dimensioned so as to be equal to a diameter of housing 12, within the limits of pertinent manufacturing tolerances. A projection 101d extends from the body portion 101a for insertion into a second end of the hollow piston body, for use in securing the second endcap to the piston body using, for example, an interference fit, adhesive attachment, a weld, a crimp, or any other suitable method. In the embodiment shown, the second end 16 of piston rod assembly 23 is structured to extend outside the housing 12.

Also, an end surface 23s of the piston rod assembly 23 is structured to engage a portion of a structure (for example, a hood of an automobile) (not shown) to be moved by the actuator upon activation thereof. To this end, a diameter or other dimension of the portion of the piston rod assembly in contact with the structure may be as large as is feasible for a given application. Also, the piston second end 34 may have any of a variety of shapes suitable for facilitating engagement with or contact a portion of the vehicle or other structure.

Each of endcaps 99 and 101 and/or any other elements of the piston may be formed from a metallic material, a polymer, or any other suitable material or materials.

A sealing means or resilient gasket 38 is fitted within the rectangular groove 28 to aid in preventing ignition products from being blown past the contact interface between the gasket and the housing wall 15. In the embodiment shown, the sealing means is in the form of an o-ring having a rectangular cross-sectional area conforming substantially to the shape of the groove 38.

The seal 38 and groove 28 are sized with respect to each other such that a seal surface 38a is in contact with groove floor 28a, a first side 38b of the seal adjacent surface 38a is in contact with larger diameter piston portion 32, a second side 38c of the seal adjacent surface 38a is in contact with smaller diameter piston portion 26, and a radially outermost side 38*d* of the seal is in contact with housing wall 15 prior to activation of the actuator. The seal 38 and groove 28 are also sized with respect to each other so as to minimize compression of the seal between smaller diameter piston portion 26 and larger diameter piston portion 32 prior to activation of the actuator. This reduces resistance to movement of the seal 38 in a radially outward direction (toward housing wall 15) during operation of the actuator.

As shown in FIG. 1A, a distance D is the distance from a radially outermost surface of larger diameter piston portion 32 to the floor 28*a* of groove 28. To maintain seal member 38 within groove 28, smaller diameter piston portion 26 must have at least a minimum diameter, or the seal 38 may roll out of the groove past the smaller diameter piston portion 26 during operation of the actuator. To maintain the seal 38 within groove 28, it has been found that the radial distance from the floor 28*a* of groove 28 to the radially outermost surface of smaller diameter piston portion 26 should be at least equal to D/2.

In a particular embodiment, the outer diameter of larger diameter piston portion 32 is 17 millimeters and the outer diameter of smaller diameter piston portion 26 is 16 millimeters, both dimensions being within the limits of pertinent manufacturing tolerances.

As stated previously, the contact normal force between the o-ring 38 and the housing wall 15 affects the force required to move the piston within the housing during piston assembly extension, and will thus affect the speed of actuation of the piston. The contact normal force will also affect the post-actuation response of the piston assembly to forces (such as hood weight and pedestrian impact forces) tending to force the extended piston assembly back into housing 12.

Figures 2, 3:
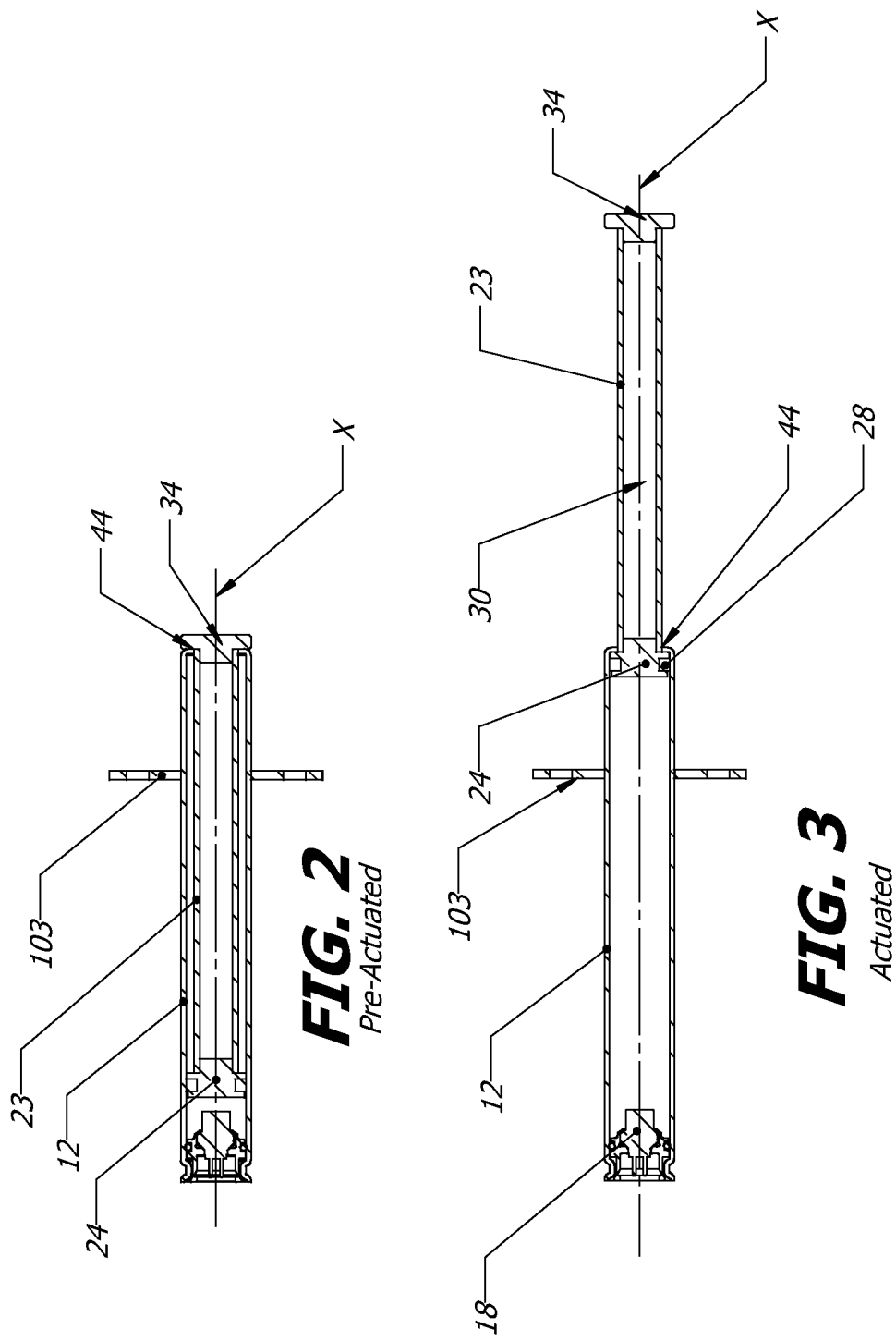
FIG. 2 is a cross-sectional side view similar to that of FIG. 1 showing the actuator in a pre-actuation or retracted condition.
FIG. 3 is a cross-sectional side view similar to that of FIG. 2 showing the actuator in a post-actuation or deployed condition.

In particular embodiments, the diameter of groove floor 28*a*, identified as third diameter 28*d*, may be adjusted such that a dimension of the O-ring 38 is radially compressed and deflected between the groove floor and the housing wall 15 prior to activation of the actuator and after the actuator piston assembly has reached its full extension (shown in FIG. 3). This compressive pre-load (if applied) will increase the friction forces between the O-ring and the housing wall. Thus, the pre-load increases the force required to move the piston within the housing during piston assembly extension, and will thus affect the speed of actuation of the piston. The pre-load will also affect the post-actuation response of the piston assembly to forces (such as hood weight and pedestrian impact forces) tending to force the extended piston assembly back into housing 12.

For an o-ring material which deforms elastically and in a known manner over the pertinent range of radial deflections or compressions, imparting a known radial compression to the o-ring will generate a known corresponding contact normal force between the o-ring and the housing wall. Thus, adjustment of the diameter of groove floor 28*a* may be used to control the amount the o-ring compresses or deflects radially when inserted into the housing, thereby correspondingly adjusting the pre-load or contact normal force between the o-ring and the housing wall 15. The ability to adjust the pre-load enables the post-actuation force response of the actuator to applied loading to be adjusted or tuned, as needed for a particular application.

FIG. 1B shows a cross-sectional view of a rectangular o-ring mounted in a groove in accordance with one embodiment described herein. The solid line is a profile of the o-ring prior to insertion of the o-ring into the housing. The dashed line is a profile of the o-ring after insertion of the o-ring into the housing, where the o-ring is pre-compressed by a distance C by contact with the housing wall 15.

The pre-compression distance required to generate the contact forces needed for a particular application can be determined analytically or iteratively through experimentation, and will depend on such factors as the elastic modulus or force-deflection characteristics of the o-ring material, the force responses required of the actuator during and after extension of the piston assembly, the desirability of adding a gas generant material to the actuator assembly, and other pertinent factors.

In an embodiment where the o-ring is radially compressed or deflected to generate a pre-load prior to actuator operation, the o-ring will be further radially compressed and the contact normal forces between the o-ring and the housing wall will be further increased when the pressurized gases flow between the o-ring and the groove floor 28*a*.

In certain applications, an amount of gas generant material may be added to the actuator as previously described to increase the forces acting on the compressive side 36 of the piston end 24, to aid in overcoming increased friction forces between the o-ring 38 and the housing wall 15 and/or to lift or move a heavier load applied to the piston rod assembly second end 34.

In accordance with one embodiment of the actuator described herein, no gas generant material is included in the initiator assembly, and combustion of the initiator assembly charge pressurizes any ambient air or gases residing within a chamber 20 (described below) to produce motion of the piston. In an alternative embodiment, a predetermined amount of gas generant material (not shown) is incorporated into the initiator assembly or within housing 12 so as to be combustible responsive to activation of the initiator assembly. Combustion of the gas generant material increases the pressure acting on the piston according to the requirements of a particular application. Combustion of the added gas generant material will also increase the generated gas pressure acting on the piston end 24, thereby increasing the possibility of blow-by. However, due to the structure of the piston end described herein, the contact force between the housing wall 15 and the sealing means 38 is correspondingly increased, thereby increasing the effectiveness of the seal.

Thus, the actuator embodiments described herein implement a method of forming a seal including the steps of providing a housing; providing a piston slidably mounted within the housing, the piston having a first portion with a first diameter dimensioned to form a sliding fit between the piston and the housing, and a second portion having a second diameter less than the first diameter; providing a groove formed between the first and second piston portions, the groove having a third diameter dimensioned such that a resiliently deformable sealing means positioned within the groove is compressed by a predetermined amount between the housing and a floor of the groove when the groove is inserted into the housing, thereby providing a first contact normal force component between the sealing means and the housing; positioning a resiliently deformable sealing means within the groove; inserting the piston into the housing to compress the sealing means so as to provide the first contact normal force component; and introducing a pressurized gas into the groove through a gap between the piston second portion and the housing, such that the gas flows between a floor of the groove and the sealing means, thereby further compressing the sealing means in a direction toward the housing and providing a second contact normal force component between the sealing means and the housing acting in addition to the first component.

In one particular embodiment, the diameter of the groove floor 28a is determined and specified so as to provide a pre-actuation contact normal force between the seal and the housing, as previously described. The magnitude of this force is such that the increased contact normal force provided by introduction of the pressurized gases into the groove enhances the seal to a point where the pressurized gases are trapped within the actuator during extension of the piston and are also retained within the actuator after full extension of the piston rod assembly has been reached. This retained pressurized gas then affects the post-actuation force response of the actuator. Thus, this particular embodiment implements a method in which the step of providing a groove comprises providing a groove having a third diameter (i.e., the diameter of the groove floor) dimensioned such that a sum of the first contact normal force component (the force component produced by compressing the seal between the housing and groove floor prior to activation of the actuator) and the second contact normal force component (the force component produced by introducing the compressed gas into the groove) provides a seal sufficient to prevent a flow of gas between the sealing means and the housing after activation of the actuator.

In another particular embodiment, the diameter of the groove floor 28a is determined and specified so as to provide a pre-actuation contact normal force between the seal and the housing, as previously described. This force has a magnitude such that the increased contact normal force provided by introduction of the pressurized gases into the groove enhances the seal to a point where blow-by during piston rod extension is eliminated or minimized. However, in this embodiment, the pre-actuation seal compression is insufficient to, in combination with the additional normal force provided by the pressurized gases, maintain the seal such that gases remain trapped in the actuator after full piston rod extension. Thus, the pressurized gases gradually leak or vent past the seal after actuation, to a point where the post-actuation force response of the actuator is effectively determined only by the contact normal force provided by pre-actuation compression of the seal.

In another particular embodiment, one or more vent openings (not shown) are located along housing 12 so that pressurized gases are vented or released from the actuator after full extension of the piston rod assembly is achieved. After venting, the post-actuation force response of the actuator is effectively determined only by the contact normal force provided by pre-actuation compression of the seal.

As shown in FIG. 2, housing second end 16 may be formed so as to provide an opening 44 permitting actuator end 34 of the piston rod assembly to extend therethrough, to an exterior of the housing. In addition, a shoulder 45 is provided surrounding the opening 44 to serve as a hard stop for engaging the relatively larger diameter portion 32 of piston rod assembly 23 after activation of the actuator, thereby limiting travel of the piston within the housing.

In the embodiment shown, a mounting flange 103 is welded or otherwise suitably secured to an exterior of housing 12, to aid in mounting the actuator to a vehicle or other structure.

Referring to FIG. 4, in operation, the linear actuator 10 is activated when the igniter 18 receives a signal from a vehicle processor 200 that responds to an impact, deceleration, or other known appropriate sensor 300 indicating an imminent or occurring impact of a pedestrian on the vehicle hood. Upon receipt of the activation signal, activation of the initiator assembly produces ignition products generating pressurized gases which are routed about an annular channel or gap 40 defined between the housing wall 15 and the smaller diameter portion 26, then into contact with the sealing means 38. As the pressurized gases enter the groove 28 through gap 40 and contact the seal 38, the gases flow between the seal and the floor 28a of the groove, pressing on the seal along surface 38c and pressing the o-ring annularly outwardly toward the housing wall 15. Due to the rectangular cross-sectional shape of the o-ring and the fact that the outermost flat surface 38d of the o-ring is pressed against the housing wall 15 along the length of the o-ring, the contact area between the o-ring and the housing is greater than would it would be if an o-ring with a circular cross-section was used. Thus, the seal between the housing and the o-ring is enhanced, thereby helping to prevent "blow-by" of the generated gases between the seal and the housing. In this way, "blow-by" or leakage of the ignition products past the seal is prevented or minimized, thereby maximizing the efficiency of force transmission on the compressive side 36 of the piston end 24, to provide the force necessary for actuator operation.

As the pedestrian makes contact with the associated vehicle and/or vehicle hood, the sensor senses the impact and the processor signals the initiator assembly 18 to activate. Upon activation, heat and pressurized combustion products from the initiator assembly 18 provide pressurized gases within compression chamber 20 which contact the compressive side 36 of the piston and force the piston first end 24 along the length of the housing body 12 to the second housing end 16. As the piston rod assembly 23 is propelled within and along the length of the housing 12, the second end 34 of the piston rod assembly 23, larger in diameter than the remainder of the piston rod assembly 23, functions to elevate or raise the hood to mitigate the harm or injury to the pedestrian in contact therewith.

The lack or reduction of pressurized gas "blow-by" in the embodiments described herein enhances the efficiency of the gas produced by the initiator assembly, and also the overall efficiency of the actuator, because the need for a gas generating due to be employed in addition to the initiator assembly is reduced or eliminated. In applications where an amount of gas generant material is incorporated into the actuator and is ignited by the initiator assembly, the enhanced seal between the sealing means 38 and the housing 12 will increase the efficiency with which the generated gases are used. This enables minimization of the amount of gas generant material needed for a particular application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

Unless stated otherwise, the terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the drawing FIGURES. It should be noted that the orientation of various elements may differ according to other exemplary embodiments, and that such variations are intended to be encompassed by the present disclosure.

It is important to note that the construction and arrangement of the linear actuator as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A linear actuator comprising:
   a housing having an inner wall; and
   a piston slidably mounted within the housing, the piston having:
      a first portion adjacent to the inner wall and slidably engaged with the inner wall of the housing upon actuation of said actuator;
      a second portion having a length and spaced apart from both the housing and the first portion, said second portion defining an annular passage between said second portion and said inner wall of said housing, said annular passage coextensive with the length of said second portion;
      a groove formed adjacent said annular passage and said groove formed between the first and second portions; and
      a resilient seal having first, second, third, and fourth sides that define a solid rectangular cross sectional shape, the resilient seal being disposed within the groove, the first side of the resilient seal being an outer radial surface that fully abuts the inner wall of the housing and the second side of the resilient seal being an inner radial surface that abuts a floor of the groove prior to introducing a pressurized fluid into the housing, the resilient seal comprising an elastically deformable material, and
      wherein the groove comprises a first surface that extends between the first portion and the floor and a second surface that extends between the floor and the second portion, the third and fourth sides of the resilient seal extend between the first and second sides of the resilient seal and are spaced apart from each other, the third side of the resilient seal abuts the first surface of the groove, and the fourth side of the resilient seal abuts the second surface of the groove prior to introducing the pressurized fluid into the housing.

2. The actuator of claim 1 further comprising a pressurized fluid source operatively coupled to the housing so as to enable fluid communication between the fluid source and the second portion after activation of the pressurized fluid source.

3. The actuator of claim 2 wherein the pressurized fluid source is an initiator.

4. The linear actuator of claim 1 wherein the first portion of the piston has a first diameter, the second portion of the piston has a second diameter, and wherein the first diameter is greater than the second diameter.

5. The actuator of claim 4 wherein said floor has a third diameter that is less than the second diameter.

6. The actuator of claim 1 wherein the outer radial surface of the resilient seal abuts the inner wall of the housing with a contact normal force component prior to movement of the piston, and wherein upon activation of a pressurized fluid source operatively coupled to the housing, the contact normal force component increases in response to compression of the resilient seal resulting from the flow of a pressurized gas entering the groove through the annular passage.

7. The actuator of claim 5 wherein a difference between the second diameter of the second portion of the piston and the third diameter of the floor of the groove is equal to at least half of a difference between the first diameter of the first portion of the piston and the third diameter of the floor of the groove.

8. The actuator of claim 3 further comprising an amount of gas generant material positioned so as to be combustible responsive to activation of the initiator.

9. The actuator of claim 8 wherein the amount of gas generant material is positioned within the initiator.

10. The actuator of claim 1 wherein the housing defines one or more vent openings extending from the inner wall of the housing to an outer wall of the housing.

11. The actuator of claim 2, wherein the housing has a first end adjacent a second portion of the piston prior to movement of the piston, and the pressurized fluid source is operatively coupled to the first end of the housing.

* * * * *